FLEXURAL STRENGTHS OF SAPPHIRE ($Al_2O_3$) WHISKER BODIES OF DIFFERENT POROSITIES PRODUCED BY HOT-PRESSING IN TUNGSTEN AT TEMPERATURES BETWEEN 1400 AND 1650°C IN ARGON

TENSILE STRENGTH IN FLEXURE FOR SILICON CARBIDE (SiC) WHISKER BODIES HOT-PRESSED IN TUNGSTEN OR CARBON AT PRESSURES FROM 100 TO 1200 PSI AT TEMPERATURES OF 1400 TO 1650°C FOR 1 HR. IN ARGON BEFORE TESTING-SAMPLES WERE FIRED FOR 100 HRS. AT 1530°C IN AIR.

United States Patent Office 3,541,672
Patented Nov. 24, 1970

3,541,672
PROCESS FOR FORMING A PROTECTIVE CERAMIC COATING ON A METAL SURFACE
Charles O. Hulse, Manchester, Conn., assignor to United Aircraft Corporation, East Hartford, Conn., a corporation of Delaware
Continuation-in-part of application Ser. No. 657,686, Aug. 1, 1967. This application June 17, 1969, Ser. No. 834,126
Int. Cl. B23k 31/02
U.S. Cl. 29—471.9        3 Claims

ABSTRACT OF THE DISCLOSURE

A process for forming a protective ceramic coating, the coating being resistant to spalling and to mechanical and thermal stresses, is provided. In the process ceramic whiskers are hotpressed into a unitary body of 60–90 percent of the theoretical density and provided with an impervious ceramic coating in hotpressing operation utilizing fine ceramic powders. A metallic surface is provided on the opposite surface of the whisker body and the metallic surface is bonded to the metal surface to be protected.

---

This application is a continuation-in-part of application Ser. No. 657,686, filed Aug. 1, 1967, now abandoned.

BACKGROUND OF THE INVENTION

In the field of brittle materials, principally the ceramics, to which the present invention relates, much interest is currently directed toward the development of processes which will permit the greater utilization of these materials. Ceramics, of which the refractory oxides may be considered as exemplary, possess many advantageous properties which suggest the desirability of their use in several diverse applications, particularly those requiring high temperature inertness and stability. Unfortunately, the ceramics are generally limited in utility by their brittleness, poor machinability and thermal shock sensitivity. Furthermore, the ceramics in general are sensitive to impact and are generally weaker than theoretical considerations of their bond strengths indicate that they should be.

The fundamental reason for the brittleness of the ceramic materials, when provided in bulk form, is that there is generally no way for the bulk material at the various temperature levels of interest to relieve local mechanical stresses by plastic deformation or otherwise without forming cracks. These cracks propagate easily, either because the dislocations are immobile in the structure or because the dislocations are not capable of movement on enough slip planes to satisfy the requirements for polycrystalline ductility. Faults of this nature naturally tend to make these materials weak, particularly in tension.

It is now known that many of the ceramic materials in fiber form exhibit strengths on the order of the theoretical. However, in order to exploit the advantageous strength properties of the individual whiskers in practical hardware, it is usually necessary to gather them together in a structure in such a way that a localized failure in one isolated fiber will not be transmitted to the adjacent fibers and, further, to provide distribution of the load imposed on the structure with reasonable uniformity over the entire whisker bundle. One method of effecting this result is to encase the fibers in a matrix material which will deform plastically. This is the technique generally utilized in the fabrication of fiber-reinforced articles at the present time. The incorporation of such a deformable material into the structure, however, usually results in a sacrifice of some of the otherwise favorable properties inherent in the ceramic whiskers themselves, particularly insofar as the high temperature characteristics of the structure are concerned. This compromise of properties may result either from the inherent limitations of the deformable matrix material itself, such as low melting point or susceptibility to corrosion, or from limitations in the system taken as a whole, such as limited chemical compatibility between the whiskers and the matrix material, particularly at the higher temperatures. In many instances, therefore, it is desirable to fabricate articles of the ceramic materials without the necessity for inclusion of a matrix material therein.

SUMMARY OF THE INVENTION

The present invention relates to processes for forming protective coatings on metal articles utilizing ceramics or other brittle materials. It contemplates the production of structures which are characterized by reduced brittleness and thermal shock sensitivity through the provision of selected void volume internal of the structure whereby local mechanical stresses may be relieved without the necessity for plastic flow.

In accordance with the present invention, a ceramic of interest, provided in whisker form in a predetermined whisker orientation or pattern, is hotpressed at a temperature which will allow the whiskers to sinter or otherwise bond together at their many points of contact with each other, the pressure utilized in the process being limited to retain a void volume in the structure of at least ten percent and, more preferably, at least thirty percent to accommodate the desired fiber flexure as hereinafter described in detail.

In one embodiment of the invention, the individual ceramic whiskers are provided with a thin coating which, in essence, functions as a bond promoter between the whiskers during the hotpressing operation, this technique being utilized in the fabrication of those materials which are resistant to bonding without special surface preparation or treatment.

In another embodiment of the present invention the bond between contacting fibers is primarily formed during or after a hotpressing operation wherein the atmosphere is carefully controlled to alter or adjust the surface properties of the whiskers during the bonding process to form a reaction product thereon which acts as or improves the bond between whiskers.

In the most preferred embodiment of the invention a whisker body of 60–90 percent of theoretical density is provided with a protective ceramic coating on one exterior surface and with a metallic layer on the other surface and the metallic layer is bonded to the surface to be protected.

DETAILED DESCRIPTION OF THE PREFERRED EMBODIMENTS

The processes hereinafter discussed describe techniques for eliminating the brittleness in ceramic materials by providing structures of substantial void volume in which a three-dimensional structure of interconnected fibers or whiskers is utilized, the interconnections being such as to provide localized void space in the body which functions to provide room for the localized flexing of the individual fibers which in turn provide localized stress relief even in the absence of substantial ductility in the basic ceramic itself. Furthermore, even if a local stress concentration of sufficient magnitude to break an individual fiber should exist, this will not lead to the brittle fracture propagation situation normally occurring in a ceramic material since the microscopic stress concentration at the cracked front is dissipated into an adjoining void space and the macroscopic stresses are absorbed by suitable flexure of other fibers in the network. The propagation of cracks is thereby inhibited because of the strength of the whiskers and because of the local elasticity and generalized whisker flexing which can take place at the head of any potential crack.

While the individual whiskers in the body have the high modulus of elasticity normally associated with the pure solid material, the body or structure itself has a much lower modulus because of the additional fiber flexing component which is provided therein. This lower modulus, combined with the high fiber strength, allows the body to elastically relieve the many individual local stresses which may be present with a consequent reduction in the generation and propagation of local failure conditions. During bending, for example, it can be imagined that the axis of the whiskers in the tension surface lie at some angle to the stress axis. As the material deforms, these whiskers tend to align themselves parallel to this stress axis and, therefore, with deformation the stiffness or elastic modulus of the structure as a whole tends to progressively increase. In the compression surface the whiskers also flex easily at low strains, but as deformation continues the whiskers begin to interfere with one another and, hence, tend to become locked in a stiffer structure.

Figure 3:
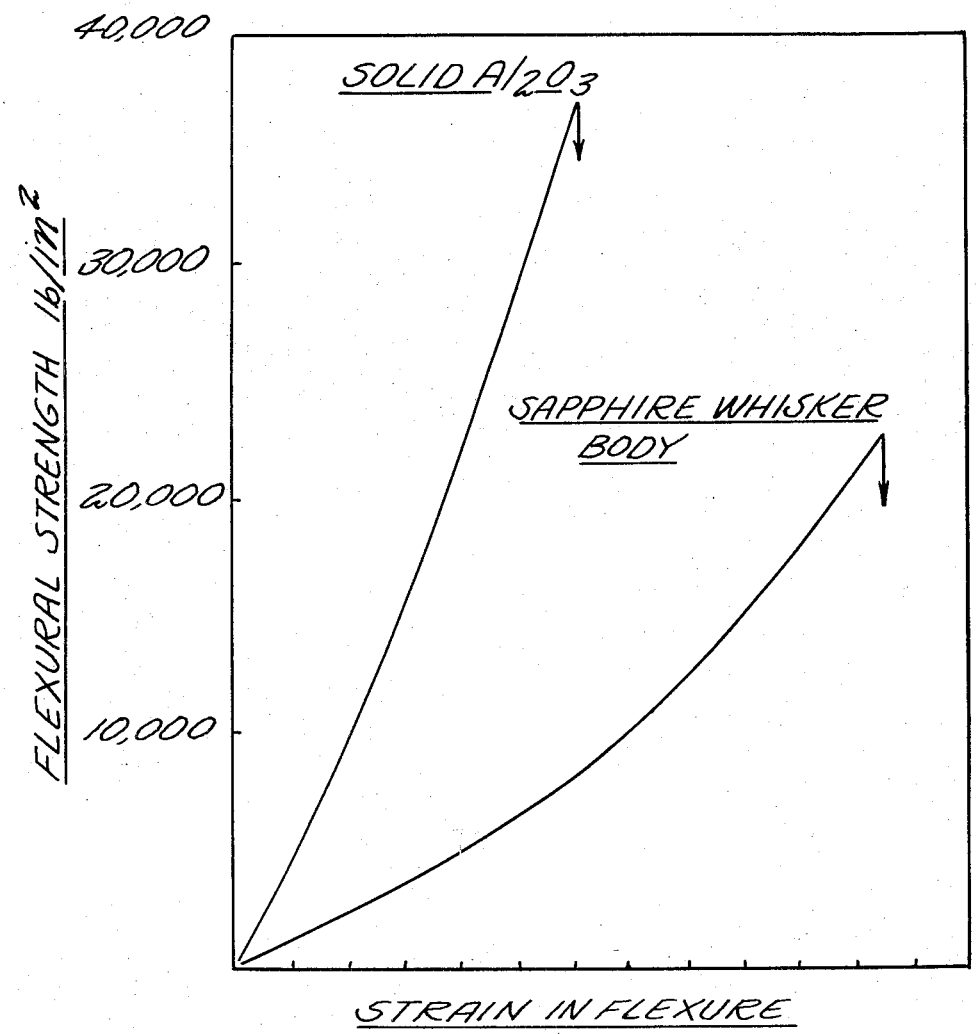
FIG. 3 is a stress-strain curve which relates the bulk flexibility of the alumina whisker structure of the present invention (33.8% void volume) to a completely dense sample of commercial alumina of identical external dimensions.

As shown in FIG. 3, for an equivalent stress, a whisker body prepared in accordance with the techniques taught herein deforms elastically by almost three times as much as alumina in the solid bulk form. This increased strain capacity markedly decreases the possibilities for localized stress concentrations and brittleness because the stresses can be distributed and dissipated into much larger volumes of the body. This capacity to undergo strain elastically instead of plastically offers an inherent structural advantage in that the strains are not permanent or cumulative. As a consequence, the fatigue properties are excellent in this type of material because the stresses are simply elastically damped.

While there is some trade-off of strength for the apparent strain capability provided, as a function of the void volume incorporated in the structure, the overall result is nevertheless a more useful ceramic component than can be prepared by any other means, since the important factor which limits the wider use of the ceramics in engineering structures is not its strength but rather its brittleness and poor thermal shock resistance as compared to most metals. In practical terms, it will be found that densities in general in excess of about 90 percent do not provide sufficient void volume to permit the degree of individual fiber flexure necessary to provide the desired physical property improvements. On the other hand, densities of less than about 60 percent are not necessary from the standpoint of reduced brittleness and increased thermal shock resistance and, hence the strength trade-off does not result in a corresponding overall property improvement below the quoted density. Accordingly, densities of from about 60–90 percent in the finished body will normally be much preferred.

In the manufacture of the ceramic whisker structures described herein, the individual fibers may or may not be prearranged in the pressing apparatus or die prior to pressing to impart preferential strength orientations to the fabricated structure. Since the individual whiskers generally exhibit the maximum strength values parallel to their own axes, alignment of the whiskers in a common direction will yield the maximum strength to the body, this unidirectional strength maximum, however, being attained to some extent at the expense of the strengths in other directions. Furthermore, it is noted that the more preferred the orientation of the individual fibers in one direction, the greater the tendency for brittleness to be observed in that direction. Conversely, the minimum brittleness and greatest elastic strain capacity is achieved with a random orientation of fibers to provide an interlaced network of fibers oriented at a variety of angles with respect to one another in the nature of a bedspring.

Preferred orientations can be achieved by first weaving continuous fibers into a rope or mat and then hotpressing and sintering and, of course, with the preweaving step and formation of a mat it is possible to achieve preferred strength orientations in given directions or given planes if desired. It is also possible by a more random orientation of fibers into batts to produce omnidirectional strength properties into the structure although, in practice, the act of compaction during the pressing operation will introduce a measured degree of fiber orientation into the fabricated structure.

Figure 1:
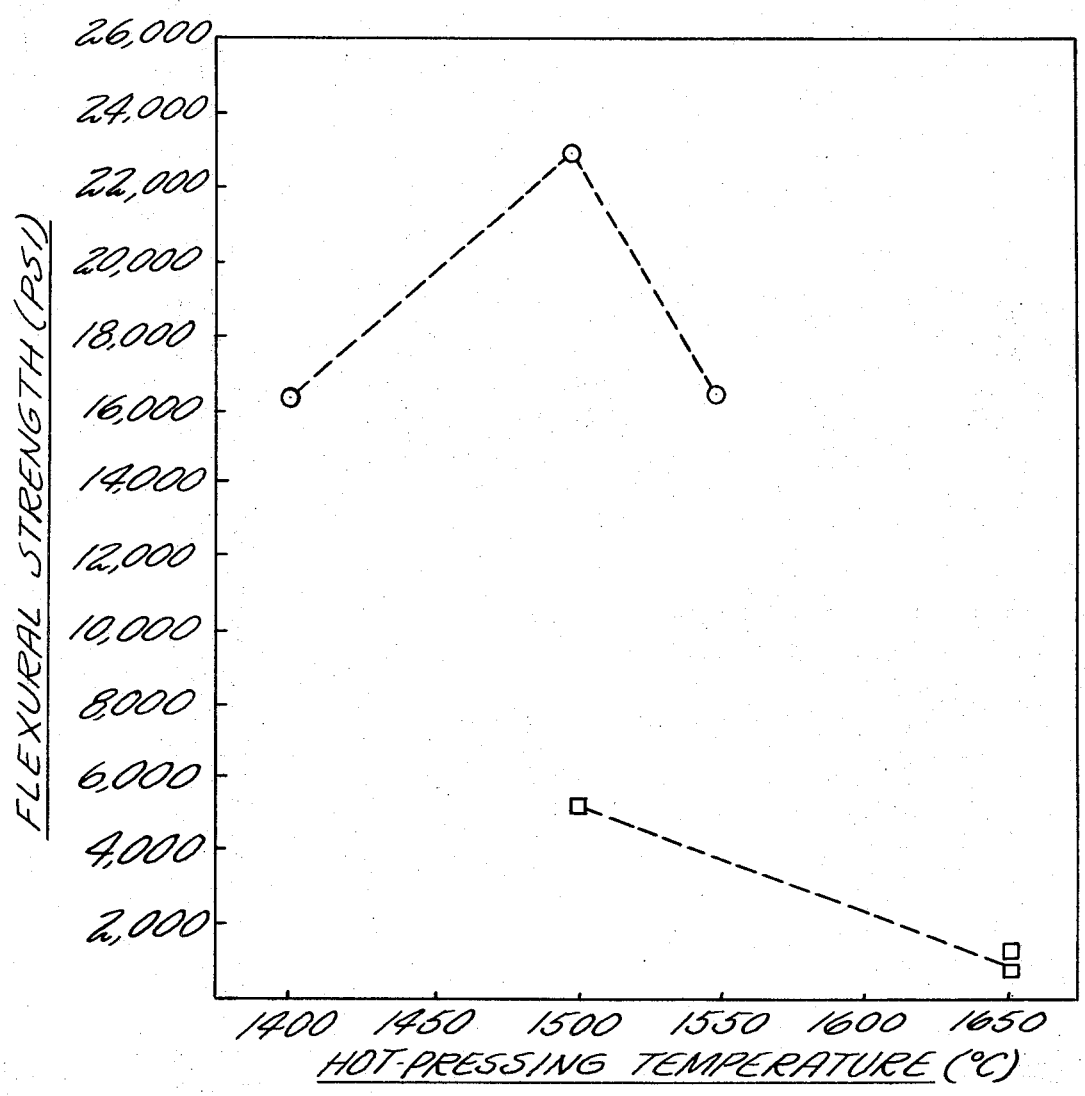
FIG. 1 is a graph depicting the flexural strengths of sapphire whisker bodies produced in accordance with the present invention by hotpressing at various temperatures and pressures in tungsten dies.
Figure 2:
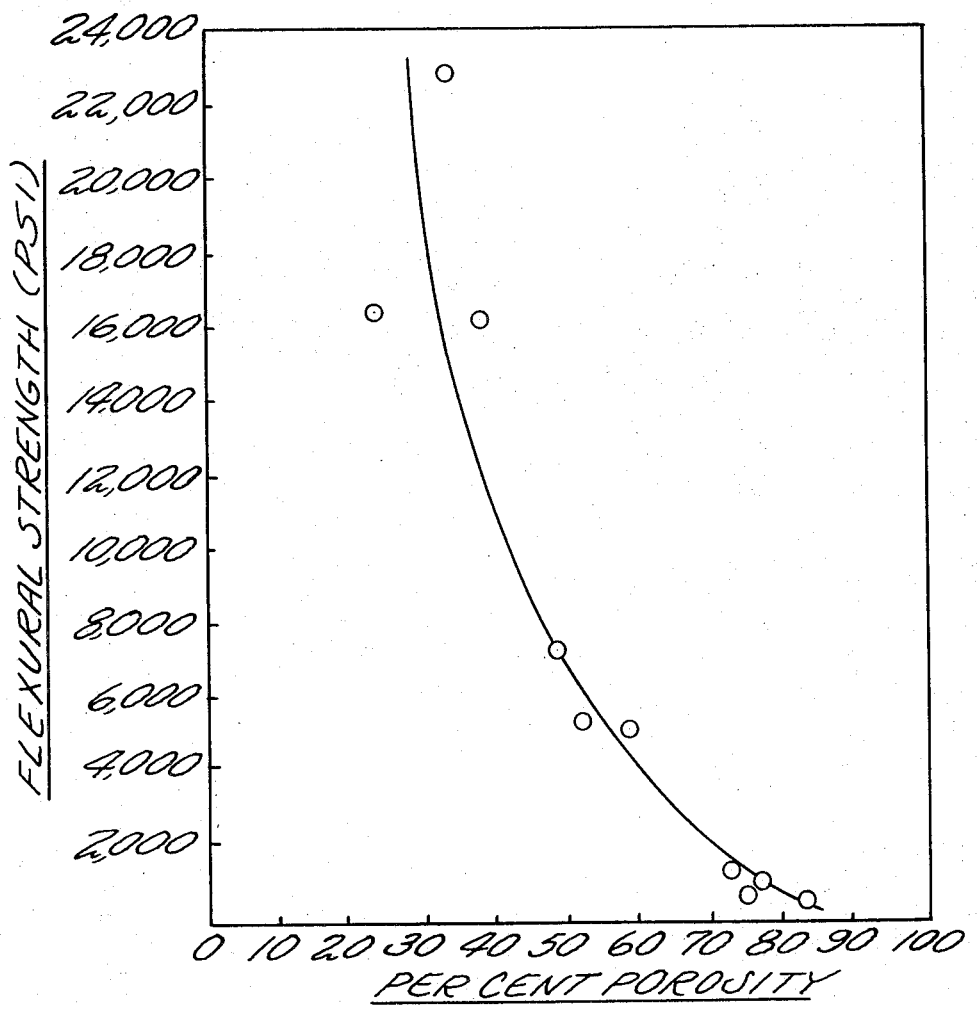
FIG. 2 is a graph illustrating the flexural strengths of sapphire whisker bodies as related to percent porosity.

In the graphs plotted in FIGS. 1 and 2, the strengths of sapphire ($Al_2O_3$) whisker bodies produced by hotpressing have been depicted as a function of temperature and pressure (FIG. 1) and as a function of porosity. The optimum pressing temperatures for the sapphire whiskers appear to lie between 1400–1600° C. while the pressures utilized depend upon the final density desired. Whisker bodies having the higher strength values of about 22,800 p.s.i., in the sapphire whisker system illustrated in FIG. 2, were achieved by hotpressing in tungsten dies at 2500 p.s.i. for one hour while the whiskers were maintained at a temperature of about 1500° C. in argon. Before testing the samples were fired for 10 hours at 1530° C. in air.

The high strength values in the whisker body are particularly notable when it is considered that one third of the body (33.8% porosity) consists of void space. The measured strength of 22,800 p.s.i. is very close to the reported maximum flexural strength of 23,000 p.s.i. for Pyroceram (Corning Glass). However, while Pyroceram melts at 1400° C. and is limited in strength at about 800° C., the individual sapphire whiskers in the product of the present invention can be formed to maintain individual strengths of over 700,000 p.s.i. at 1400° C. And as previously mentioned, the sintered whisker body is capable of three times the elastic deformation as comparable alumina in the solid bulk form.

In general, it has been found that the optimum hotpressing temperature for the alumina whisker bodies lies between about 1400–1600° C. and the optimum pressures between about 400–2500 p.s.i. The treatment temperature should be high enough to provide the bond formation between the fibers where they are in contact but below the temperature at which significant degradation of the individual whisker properties occurs, usually through a change in morphology. The particular hotpressing pressure utilized in a given case will be selected as a function of the void volume or porosity desired in the finished article.

The minimum void volume which appears essential in providing a measure of thermal shock resistance in the whisker body appears to be that yielding about 10 percent porosity although the preferred minimum in the case of alumina lies at about a 30 percent void volume.

As previously discussed, depending on the particular application involved, a balance in terms of deformability versus strength is achieved in arriving at a particular preferred article density.

To test the machinability of the sapphire whisker body described in FIG. 2, having a flexural strength of 22,800 p.s.i. at a void volume of 33.8 percent, a hole was drilled through a sample of the material 0.11 inch thick with a high speed steel drill. No difficulty was observed in the drilling operation and no cracking of the ceramic body was found subsequent to the machining operation.

In FIG. 3, the bulk flexibility of the alumina whisker structure is compared to that of a completely dense piece of commercially available alumina of identical external dimensions. For an equivalent stress, the whisker body deforms elastically by almost three times as much as the solid alumina. It will be noted that the shape of the stress-strain curve for the whisker body depicts a slope which steadily increases with increasing strength. Further, in comparing the relative strengths of the two samples, it will be noted that the higher strength of the solid alumina sample, as illustrated, would be less noticeable if the material were considered on a strength-to-weight basis since the whisker body is approximately one-third void space.

Figure 4:
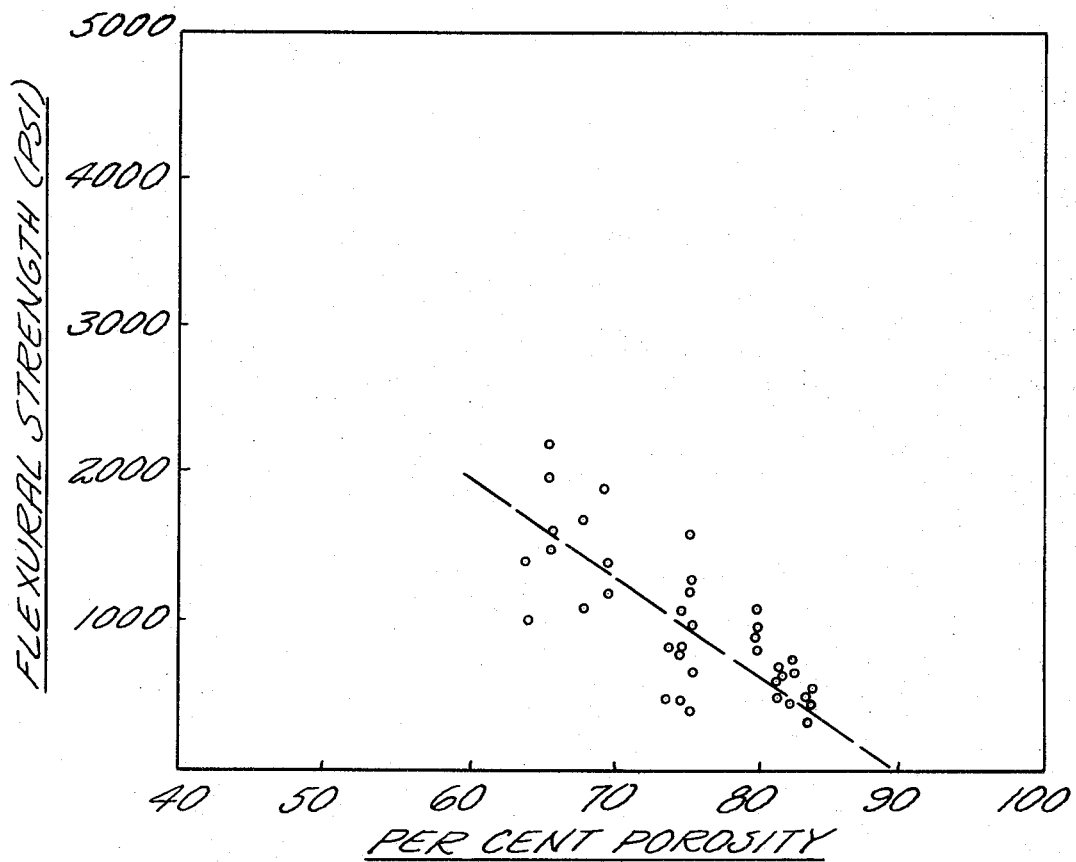
FIG. 4 is a graph plotting the flexural strength of a silicon carbide whisker body prepared according to the instant invention as related to percent porosity.

In addition to the formation of the sapphire whisker bodies as previously described in detail, bodies of other whisker materials were also fabricated. The flexural strength versus porosity results of whisker structures formed from silicon carbide are reported in FIG. 4.

The as-pressed silicon carbide whiskers were not as well bonded to each other as the sapphire whiskers and, consequently, the silicon carbide bodies were all fired in air at 1530° C. for 10 hours after the pressing operation in order to oxidize part of the carbide. The heat treatment in air formed a siliceous coating on the whiskers which acted to bond the individual whiskers together in a unitary mass. This heat treatment is necessary in the case of silicon carbide with resists bonding to itself. Attempts to force direct whisker-to-whisker welding by hotpressing in argon at temperatures much above 1650° C. results in a degradation in properties because of a progressive loss in whisker morphology. The optimum hotpressing temperatures for the silicon carbide whisker bodies appear to lie in the temperature range of 1400°–1600° C. and, as compared to the sapphire whisker bodies, higher pressures are require to achieve the more dense bodies with the greater strengths. It is notable, however, that even bodies consisting of two-thirds void space have strengths well over 1000 p.s.i., and the strength data for the silicon carbide bodies will be seen from the drawings to approximate that set forth in the saphire whisker body curve.

As seen in the case of the sapphire body, the silicon carbide whisker article is easily machined, a sample being drilled and tapped without cracking to retain a threaded bolt.

While, of course, the provision of a ceramic body having thermal shock resistance and machinability establishes immediate utility for the body, the improved characteristics will be found to be useful in other applications as well. It is possible, for example, concurrently with or after formation of the whisker body, to provide it with a hard, impervious coating, utilizing the whiskers to maintain the integrity of the coating. In accordance with one aspect of the modification, therefore, fabrication of a body could be made by introducing a layer of fine alumina powder into the die, followed by a layer of sapphire whiskers, followed by another layer of fine alumina powder. After hotpressing, a whisker body with a hard dense coating results. The coating powders need not be of the same composition as that of the whiskers nor in fact need they be applied at the same time or at the same temperature or pressures. In this manner, the strength of the whisker structure can be linked together with the imperviousness of the exterior coating.

The characteristics of the whisker body further lead to the ready solution of other practical problems. A significant advantage is frequently forecast for metals provided with a ceramic coating for oxidation-erosion or corrosion resistance for example. Unfortunately, for several reasons, but particularly because of an unfavorable mismatch between the respective metal-ceramic coefficients of thermal expansion, the ceramic coating is usually readily fractured during thermal cycling. In accordance with the present invention a whisker layer with its inherent elasticity is interposed between the ceramic and the metal layers. For example, a dense alumina coating may be applied at one surface of the whisker body as previously described and then a metal powder may be sintered or hotpressed to the opposite face at a lower temperature. This metallic layer, which may be of any thickness desired, may then be brazed or otherwise attached to other metal parts. The particular advantage of this layered construction is that, since the refractory oxide coating is attached to the metal by means of the whiskers, the elasticity of the whisker layer prevents spalling of the coating due to thermal shock or thermal expansion mismatches between the metal and the ceramic.

Inasmuch as the basic purpose of the metallic layer on the whiskers is to provide convenient means for subsequent bonding to the metal surface to be protected, it must not only be adequately bonded to the whiskers but it must also be metallurgically compatible with both ceramic whiskers and the metal surface. Although the preferred method of applying the metallic layer to the whisker body involves a powder metallurgy approach as hereinbefore described, the specific method utilized is relatively immaterial as long as adequate bonding to the whisker body is achieved and the essential porosity thereof is maintained. Accordingly, and subject to the above conditions, various of the alternative methods known in the art for applying metals to surfaces will be applicable, such as flame or plasma spray techniques, slurry coatings or brazing processes.

It is not to be implied from the foregoing detailed discussion of the various aspects of the present invention that the utility of the invention need be confined to the use of ceramic whiskers per se. For example, prior to the hotpressing operation it is possible to coat the basic ceramic whiskers with a thin layer of material which will promote the formation of a bond therebetween during the hotpressing operation. Or the surface of the whiskers themselves may be altered at some stage of the operation. In a particular example, silicon carbide whiskers are provided with a thin aluminum coating. The fibers are then hotpressed in argon at a temperature approaching the melting point of aluminum, followed by a subsequent firing in air to convert the aluminum to aluminum oxide. The thin alumina coating, which is itself refractory, will provide oxidation resistance to the fibers and, in the case of some fibers, may provide the surface protection which will give the whisker body utility in air up to temperatures of 1500° C. or higher.

In the specification, the terms fibers and whiskers have been used somewhat interchangeably. It will, of course, be obvious that the terms make reference to those materials provided in the thin fibrous form as opposed to materials in bulk and, in the most preferred embodiments to those materials displaying strengths on the order of the theoretical.

From the foregoing discussion it will be seen that there has been provided by this invention a process which yields ceramic bodies of reduced brittleness, improved resistance to thermal shock and much improved machinability. Having achieved these properties in a ceramic material, there are many useful applications for the products, some of which have been hereinbefore presented. While the present invention has been described in connection with particular preferred examples, including materials and processing parameters, these examples are illustrative only.

The invention in its broader aspects is not limited to the exact details described, for obvious modifications will occur to those skilled in the art.

I claim:
1. The method of forming a protective, layered, ceramic coating on the surface of a metal article, the protective coating being resistant to spalling and to mechanical and thermal stresses applied to said article, comprising:
   (a) placing a mass of ceramic whiskers in a hot press;
   (b) hotpressing said whiskers at a temperature and pressure sufficient to effect interwhisker bonding and to form a porous body having a density of 60–90 percent of the theoretical density and a selected void volume within said body to permit localized flexing of said whiskers to relieve said stresses;
   (c) positioning a layer of fine ceramic powder against one surface of said porous body in a hot press;
   (d) hotpressing said porous body-ceramic powder mass to render said ceramic powder as an impervious coating bonded to said porous body;
   (e) forming a metallic coating bonded to the opposite surface of the porous body;
   (f) and bonding the metallic coating to the surface of the metal article.

2. The method of forming a protective, layered, ceramic coating on the surface of a metal article, the protectective coating being resistant to spalling and to mechanical and thermal stresses applied to said article, comprising:
   (a) placing a layer of ceramic whiskers and a layer of ceramic powder within a hot press;
   (b) hotpressing said whiskers at a temperature and pressure sufficient to effect interwhisker bonding and to form a porous whisker layer having a density of 60–90 percent of the theoretical density and a selected void volume within the whisker layer to permit localized flexing of said whiskers to relieve said stresses, said hotpressing rendering the ceramic powder as an impervious coating bonded to the whisker layer;
   (c) forming a metallic coating bonded to the opposite surface of the whisker layer;
   (d) and bonding the metallic coating to the surface of the metal article.

3. The method of forming a protective, layered, ceramic coating on the surface of a metal article, the protective coating being resistant to spalling and to mechanical and thermal stresses applied to said article, comprising:
   (a) placing a layer of ceramic whiskers between a layer of fine ceramic powder and a layer of powdered metal within a hot press;
   (b) hotpressing said whiskers at a temperature and pressure sufficient to effect interwhisker bonding and to form a porous whisker layer having a density of 60–90 percent of the theoretical density and a selected void volume within whisker layer to permit localized flexing of said whiskers to relieve said stresses, said hotpressing rendering said ceramic powder as an impervious coating bonded to the whisker layer and sintering and bonding the powdered metal to the whisker layer;
   (c) and removing the hotpressed mass from the press and bonding the sintered metal layer to the surface of the metal article.

References Cited

UNITED STATES PATENTS

| | | | |
|---|---|---|---|
| 2,108,513 | 2/1938 | Shardlow | 264—122 |
| 2,890,147 | 6/1959 | Pearson | 264—112 |
| 2,943,008 | 6/1960 | Saunders | 264—112 |
| 3,386,918 | 6/1968 | Hough | 106—65 |

FOREIGN PATENTS 954,285  4/1964  Great Britain.

ROBERT F. WHITE, Primary Examiner

J. R. HALL, Assistant Examiner

U.S. Cl. X.R.

29—472.9, 473.1; 264—133; 106—44, 65